(12) United States Patent
Lee (10) Patent No.: US 7,796,713 B2
(45) Date of Patent: Sep. 14, 2010

(54) AUTOMATIC GAIN CONTROL DEVICE AND METHOD

(75) Inventor: Tae Won Lee, Gyeonggi-do (KR)

(73) Assignee: LG Electronics, Inc., Seoul (KR)

( * ) Notice: Subject to any disclaimer, the term of this patent is extended or adjusted under 35 U.S.C. 154(b) by 1291 days.

(21) Appl. No.: 11/001,996

(22) Filed: Dec. 1, 2004

(65) Prior Publication Data

US 2005/0146643 A1    Jul. 7, 2005

(30) Foreign Application Priority Data

Dec. 1, 2003    (KR) ...................... 10-2003-0086343

(51) Int. Cl.
*H04L 27/08* (2006.01)
*H03K 9/00* (2006.01)
(52) U.S. Cl. .................... 375/345; 375/316; 348/678; 348/497
(58) Field of Classification Search .................. 375/345, 375/316; 348/678, 497
See application file for complete search history.

(56) References Cited

U.S. PATENT DOCUMENTS

| | | | |
|---|---|---|---|
| 7,050,419 B2* | 5/2006 | Azenkot et al. | 370/347 |
| 2002/0003836 A1* | 1/2002 | Azakami et al. | 375/239 |
| 2003/0030930 A1* | 2/2003 | Sugawara et al. | 360/48 |
| 2003/0162518 A1* | 8/2003 | Baldwin et al. | 455/253.2 |
| 2003/0223434 A1* | 12/2003 | Hwang et al. | 370/395.62 |
| 2004/0042683 A1* | 3/2004 | Hagisato et al. | 382/276 |

* cited by examiner

*Primary Examiner*—David C Payne
*Assistant Examiner*—Brian J Stevens
(74) *Attorney, Agent, or Firm*—Lee, Hong, Degerman, Kang & Waimey (57) ABSTRACT

An automatic gain control device in a digital broadcast receiver is provided. The device is constructed to include an AGC for receiving an input signal and a predetermined power reference value to thereby obtain a gain error value, determining one of a plurality of operational areas according to a received AGC step control signal, and generating an RF gain control signal and an IF gain control signal according to the gain error value; and a lock detector for receiving the gain error value and the predetermined power reference value and thereby generating the AGC step control signal and an AGC lock/unlock signal.

33 Claims, 9 Drawing Sheets

AUTOMATIC GAIN CONTROL DEVICE AND METHOD

This application claims the benefit of the Korean Application No. 10-2003-0086343 filed on Dec. 1, 2003 which is hereby incorporated by reference.

BACKGROUND OF THE INVENTION

1. Field of the Invention

The present invention relates to a lock detector of an automatic gain control loop, and more particularly, to a lock detector that determines a convergence degree of an automatic gain control loop of a digital broadcast receiver to thereby control a gain thereof.

2. Discussion of the Related Art

A digital television (TV) has been recently developed for reproducing an impression of a theater in the inner room. Compared to the existing analog TV, the digital TV has very high screen resolution (for example, 1080×1920) and a wide screen, and provides a sound of CD quality over multi-channels (for example, 5.1 channels).

Many countries, such as USA, Japan and European countries have respectively prepared a broadcast standard for the digital TV and are promoting standardization for the digital TV. Particularly, USA has adopted a vestigial sideband (VSB) technique (proposed by Zenith Corporation) as a transmission format, an MPEG technique as a video compression format, Dolby AC-3 as an audio compression format, and a display format compatible with the existing display method.

In the digital broadcast system, a transmission signal of a transmitter is constant in its gain. However, the transmission signal is varied in its gain while transmitted through various channel to a receiver. In this manner, signals of various gains are received at the receiver. However, most digital parts of a receiver are designed on the assumption that a signal of a constant gain is inputted to the receiver. Accordingly, an analog signal inputted to a receiver should be adjusted in its gain to have a constant gain, prior to conversion into a digital signal.

An automatic gain controller (AGC) device performs such a gain adjustment operation. The AGC device determines a gain of a current input signal from an average or power of an input signal. At this time, the AGC controls amplifiers in analog circuits of a radio frequency (RF) stage and an intermediate frequency (IF) stage to thereby cause the input signal to have a desired size.

Figure 1:
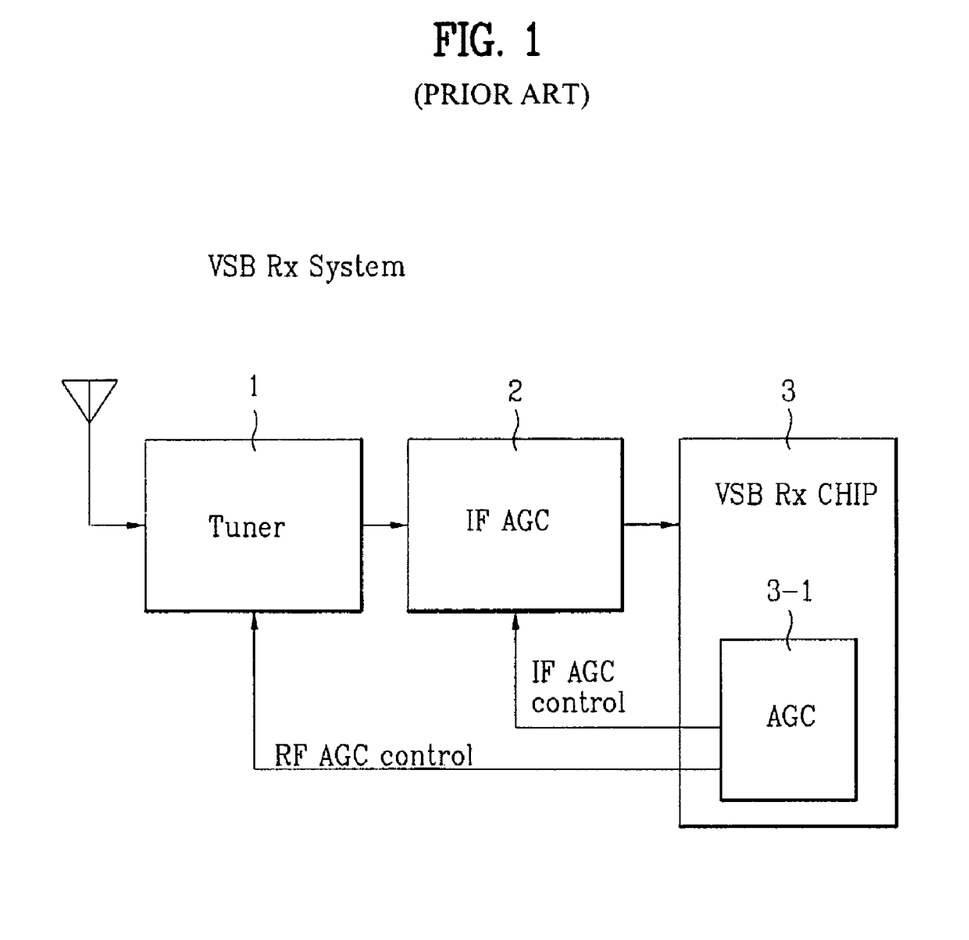
FIG. 1 is a block diagram of a general VSB receiver.

FIG. 1 is a block diagram of a general VSB receiver having an AGC.

A VSB receiver shown in FIG. 1 is an example of a receiver that uses an automatic gain controller (AGC) for directly controlling gains of a radio frequency (RF) and an intermediate frequency (IF).

Referring to FIG. 1, the VSB receiver is constructed to include a tuner 1, an IF AGC amplifier 2 and a VSB demodulator (VSB Rx chip) 3. The tuner 1 tunes only a channel frequency selected by a user from RF signals received through an antenna, and then controls the tuned RF signal to thereby convert the tuned RF signal into an IF signal. The IF AGC amplifier 2 controls and amplifies a gain of the IF signal. The VSB demodulator 3 VSB-demodulates the gain-controlled IF signal, and outputs gain control signals (RF AGC control, IF AGC control) respectively to the tuner 1 and the IF AGC amplifier 2, and directly controls gains of the RF and IF signals. Here, the VSB demodulator 3 is equipped with an AGC 3-1 for generating an IF gain control signal (IF AGC control) and an RF gain control signal (RF AGC control).

An operation of the VSB receiver will now be described with reference to FIG. 1.

Firstly, when a VSB-modulated RF signal is received through the antenna, the tuner 1 selects a desired channel frequency by tuning and then converts a tuned RF signal into an IF signal to thereby output the IF signal to the IF AGC amplifier 2. The IF AGC amplifier 2 controls a gain of the IF signal to thereby output the gain-controlled IF signal to the VSG demodulator 3. The VSB demodulator 3 VSB-demodulates the gain-controlled IF signal.

At this time, in order to maintain a constant signal gain, the AGC 3-1 of the VSB demodulator 3 compares the strength of the VSB-demodulated signal with a pre-stored gain information value. If a gain of the received signal is determined to be small from the result of the comparison, the VSB demodulator 3 generates a gain-up signal for increasing the received signal's gain. Otherwise, if a gain of the received signal is determined to be large from the result of the comparison, the VSB demodulator 3 generates a gain-down signal for decreasing the received signal's gain. The VSB demodulator 3 then outputs IF gain control signals (the gain-up signal and the gain-down signal) to the IF AGC amplifier 2.

The IF AGC amplifier 2 increases or decreases a gain of the IF signal according to the gain-up signal or the gain-down signal to thereby cause an IF signal to have a desired gain.

In an actual gain control method, after a gain is set to a maximum gain that the VSB receiver can have at the power-on time or at the time of the channel change, the tuner 1 controls a gain of the RF signal through the RF gain control signal in advance to the strength of an input signal.

If the strength of an output signal of the VSB demodulator 3 is not a desired strength even though a gain control capability of the tuner 1 reach the limit, the VSB demodulator 3 controls a gain of the IF AGC amplifier 2 through the IF gain control signal.

In this manner, the AGC 3-1 is operated by a feedback loop adequate for adjusting a gain of a signal received through an antenna.

Accordingly, it is important to adjust a convergence characteristic of the AGC 3-1 that is operated by a feedback loop.

That is, although a loop gain (or an operational area) should be increased for a rapid convergence characteristic, a signal level becomes unstable or an MSE (mean square error) of a symbol recovered by a receiver becomes great when the loop gain is increased too high.

Accordingly, it is important to develop a receiver that not only has a rapid convergence characteristic but also controls a gain stably.

SUMMARY OF THE INVENTION

Accordingly, the present invention is directed to an automatic gain control apparatus and method that substantially obviates one or more problems due to limitations and disadvantages of the related art.

An object of the present invention is to provide an automatic gain control apparatus and method that uses a lock detector for determining a convergence characteristic of an AGC of a receiver to thereby control a loop gain step by step, thereby performing an optimal AGC operation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an automatic gain control device in a digital broadcast receiver includes: an AGC for receiving an input signal and a predetermined power reference value to thereby obtain a gain error value, determining one of a plurality of operational areas according to a received AGC step control signal, and generating an RF gain control signal and an IF gain control signal according to the gain error value; and a lock detector for receiving the gain error value and the predetermined power reference value and thereby generating the AGC step control signal and an AGC lock/unlock signal.

The AGC may include: a gain error detector for receiving the input signal the predetermined power reference value to thereby obtain a gain error value; and a loop filter for accumulatively compensating the generated gain error value according to the determined operational area and thereby generating a gain-compensated value.

The AGC may further include: a delayed AGC controller for obtaining a difference between the gain-compensated value and a predetermined delayed AGC reference value; an adder for adding the gain error value to the difference value; and a loop filter for accumulatively compensating an output of the adder according to the selected operational area and thereby outputting a gain-compensated value.

The loop filer may include: a RSHIFT block for receiving the AGC step control signal and thereby determining one of a plurality of operational areas; and a delayer and an integrator for accumulatively compensating the gain error value.

The RSHIFT block may include: a gain determiner for receiving a gain error value from the gain error detector, multiplying the gain error value respectively by gains corresponding to steps of an operational area, and thereby outputting multiplication result values; and an MUX for selecting and outputting one of the multiplication result values.

The gain error detector may include: a squarer for squaring the received signal to generate a power value; and a subtractor for obtaining a difference between the power value and the predetermined power reference value and thereby detecting a gain error value.

The lock detector may include: an average gain error detector for receiving the gain error value and thereby obtaining an average gain error value; a lock count signal generator for comparing the obtained average gain error value with the predetermined input signal reference power value and thereby generating a lock/unlock count signal; a reliability counter for receiving the lock/unlock count signal, thereby generating a lock/unlock signal, and securing reliability of the lock/unlock signal; and an AGC step controller for generating an AGC step control signal according to the reliability-secured lock/unlock signal.

In another aspect of the present invention, an automatic gain control method in a digital broadcast reception system comprises the steps of: receiving an input signal and a predetermined power reference value to thereby obtain a gain error value; receiving the gain error value and the predetermined power reference value to thereby generate an AGC step control signal and an AGC lock/unlock signal; and determining one of a plurality of operational areas according to the AGC step control signal, and generating an RF gain control signal and an IF gain control signal according to the gain error value.

The step of obtaining the gain error value may include the steps of: squaring the received signal and thereby generating a power value; and obtaining a difference between the power value and the predetermined power reference value and thereby obtaining a gain error value.

The step of generating the AGC step control signal may include the steps of: receiving the gain error value and thereby obtaining an average gain error value; comparing the average gain error value with the predetermined input signal reference power value and thereby generating a lock/unlock count signal; receiving the lock/unlock count signal and reliably generating a lock/unlock signal; and generating an AGC step control signal according to the lock/unlock signal.

The step of generating the lock/unlock count signal may include the steps of: multiplying a predetermined input signal power reference value by a predetermined ratio and thereby generating an input signal Max/Min reference value; and comparing the average gain error with the input signal Max/Min reference value and thereby generating an AGC lock/unlock count signal.

An unlock count signal may be generated if the average gain error is greater than the input signal Max/Min reference value.

The step of determining one of a plurality of operational areas may include the steps of: receiving a gain error value and multiplying the gain error value respectively by gains corresponding to steps of an operational area, and thereby outputting multiplication result values; and selecting and outputting one of the multiplication result values.

The step of generating the IF gain control signal may include the steps of: accumulatively compensating a gain error value according to the determined operational area and thereby generating a gain-compensated value; and converting the gain-compensated value into an analog signal.

The step of generating the RF gain control signal may include the step of: obtaining a difference between the gain-compensated value and a predetermined delayed AGC reference value; adding the gain error value and the difference value and compensating a gain by accumulating the addition result value; and converting the gain-compensated value into an analog signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 2:
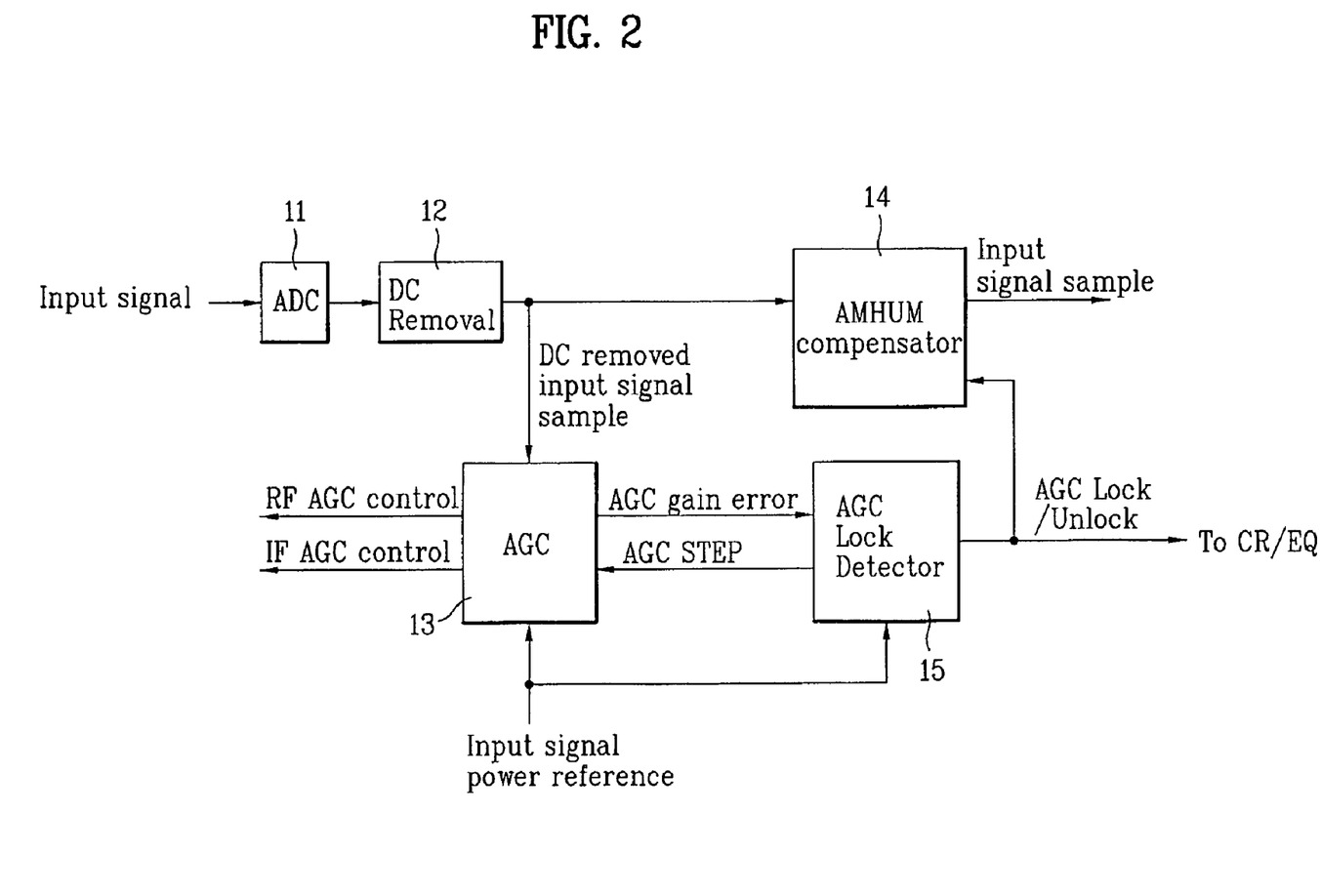
FIG. 2 is a block diagram of an AGC device having a lock detector according to an embodiment of the present invention.

FIG. 2 is a block diagram of an AGC device having a lock detector according to an embodiment of the present invention.

Referring to FIG. 2, the AGC device is constructed to include an analog-to digital converter (ADC) 11, a direct current (DC) remover 12, an AGC 13, a lock detector 15 and an AM hum compensator 14. The ADC 11 converts an input analog signal into a digital signal. The DC remover 12 removes a DC component generated during the ADC operation or at the outside. The AGC 13 receives the DC removed input signal and an input signal power reference value to thereby control gains of an outside tuner and an IF AGC amplifier. The AGC lock detector 15 receives an AGC gain error value from the AGC 13 to thereby generate an AGC step signal and AGC lock/unlock signals. The AM hum compensator 14 detects and compensates an AM hum noise of 60~120 Hz generated at a DC rectifier (not shown).

The lock detector 15 receives the AGC gain error value from the AGC 13, converts the AGC gain error value into an average gain error value, generates lock/unlock signals by comparing the average gain error value with a reference power value, obtaining reliability by counting the lock/unlock signals under observation of a direction of a count signal, and then controls a loop gain of an automatic gain control loop by gradually changing an automatic gain control step.

At this time, the lock/unlock signals are used for controlling a loop gain of an automatic gain control loop, and used as a control signal for the AM hum compensator 14, and used for determining an operation time of an after-edge carrier recovery block and an equalizer of a QAM (quadrature amplitude modulation) receiver not having a sync signal.

An operation of the AGC device will now be described in detail with reference to the accompanying drawings.

Figure 3:
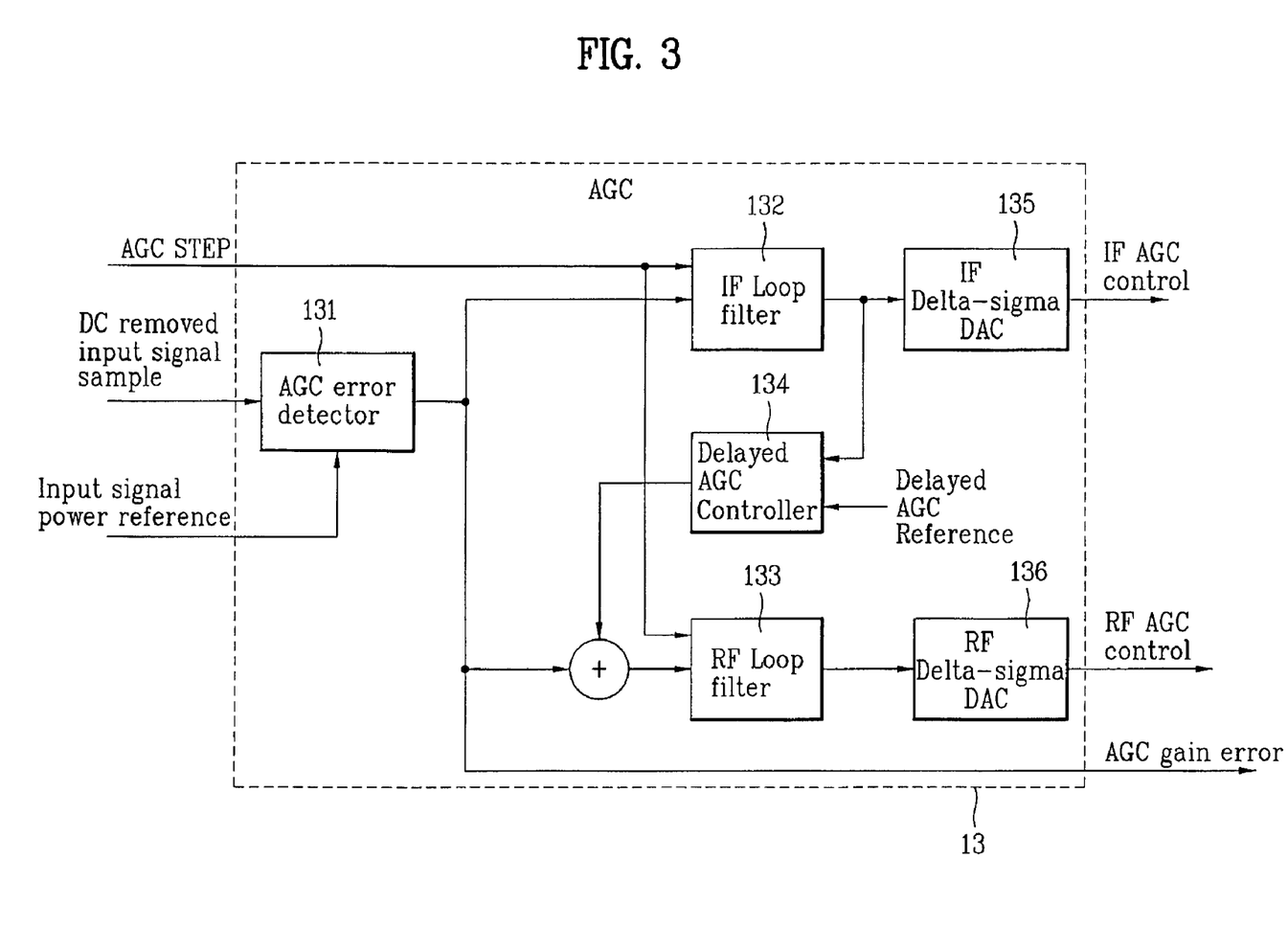
FIG. 3 is a block diagram of an AGC according to an embodiment of the present invention.

FIG. 3 is a detailed block diagram of an AGC according to an embodiment of the present invention.

Referring to FIG. 3, the AGC 13 is constructed to include an AGC error detector 131 for detecting a gain error value, IF and RF loop filters 132 and 133 for outputting a gain compensation value by accumulating the gain error value, a delayed AGC controller 134 for distributing a gain among the IF and the RF, and IF delta-sigma DACs 135 and 136 for converting the error compensated value into an analog signal.

The AGC error detector 131 receives the DC removed input signal sample, obtains an input signal power value by squaring the DC removed input signal sample, and then detects a gain error value that is a difference between the input signal power value and a predetermined input signal power reference value. The gain error value is inputted to the IF and RF loop filer 132 and 133 and the lock detector 15.

The IF and RF loop filters 132 and 133 respectively accumulates the gain error value to thereby outputs gain compensation values to the IF and RF delta-sigma DACs 135 and 136. The IF and RF delta-sigma DACs 135 and 136 respectively convert the gain compensation values into analog signals to thereby output IF and RF AGC control signals. The IF and RF AGC control signals are used for adjusting gains of an outside tuner and an IF AGC amplifier.

At this time, the AGC step signal generated by the lock detector 15 is inputted to the AGC 13 and the IF and RF loop filters 132 and 133, whereby a loop gain is determined. A gain error is accumulated according to the determined loop gain, whereby a gain compensation value is outputted.

Figure 4:
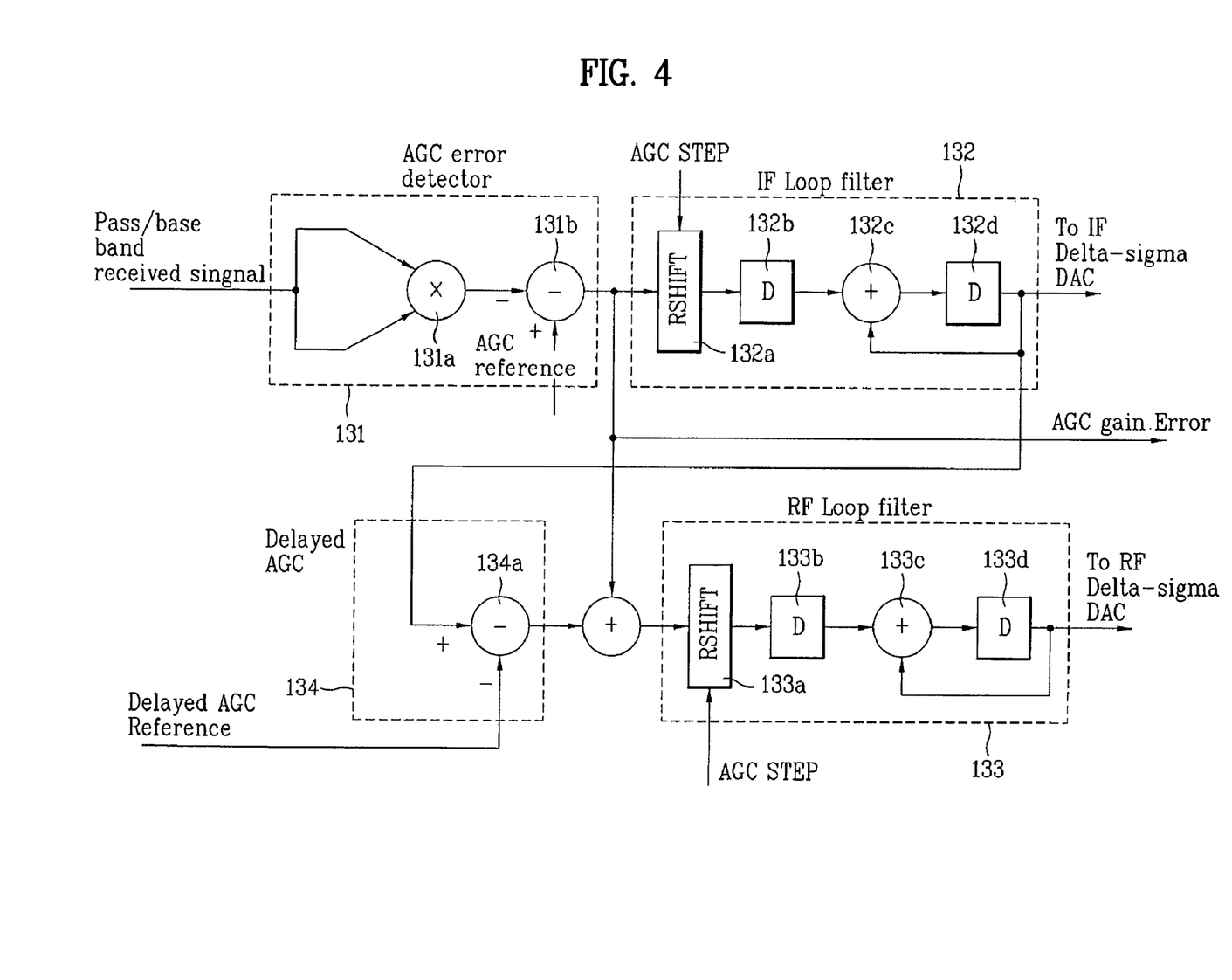
FIGS. 4 through 6 are detailed block diagrams illustrating inner constructions of an AGC according to an embodiment of the present invention.
Figure 5:
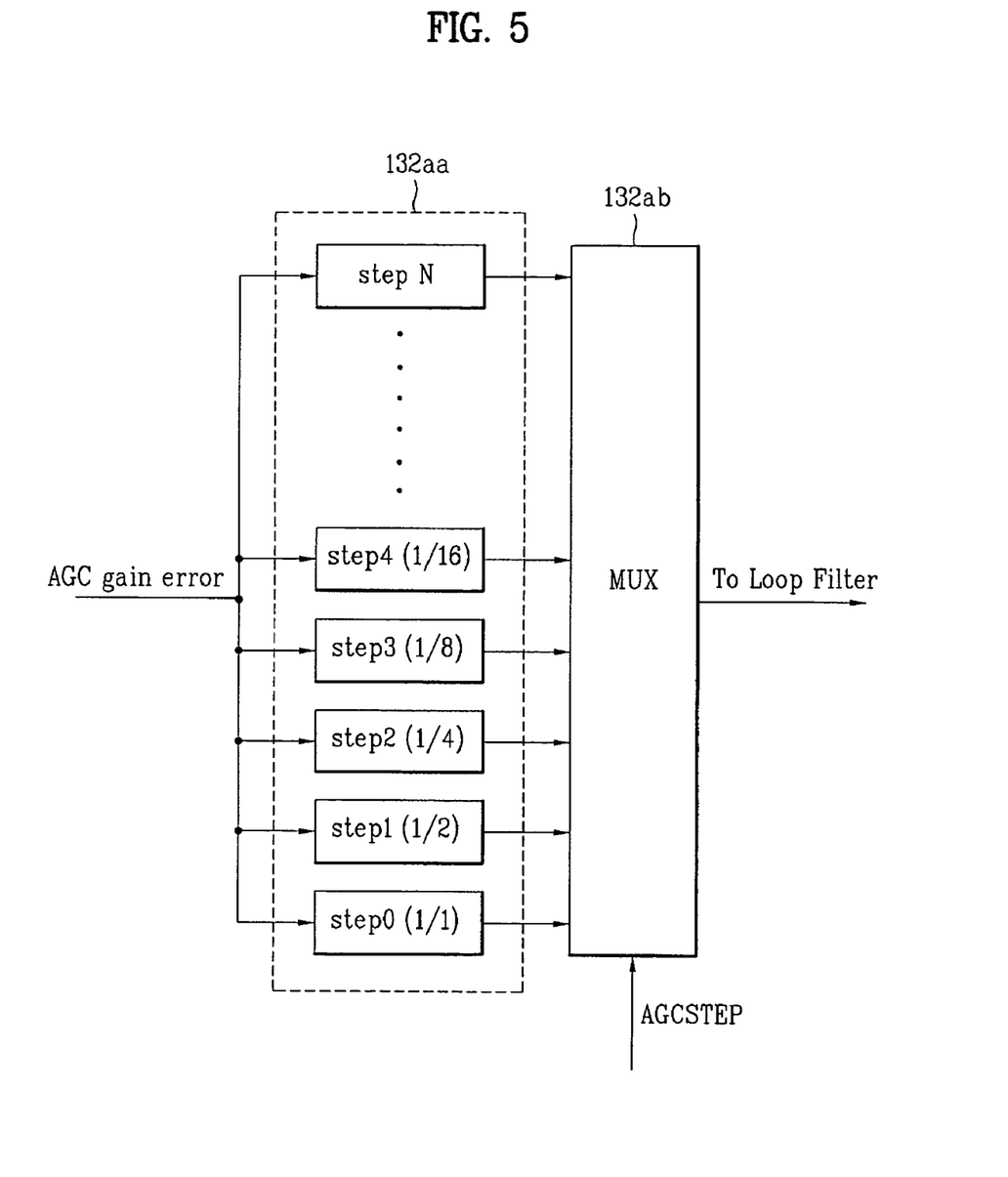
Figure 6:
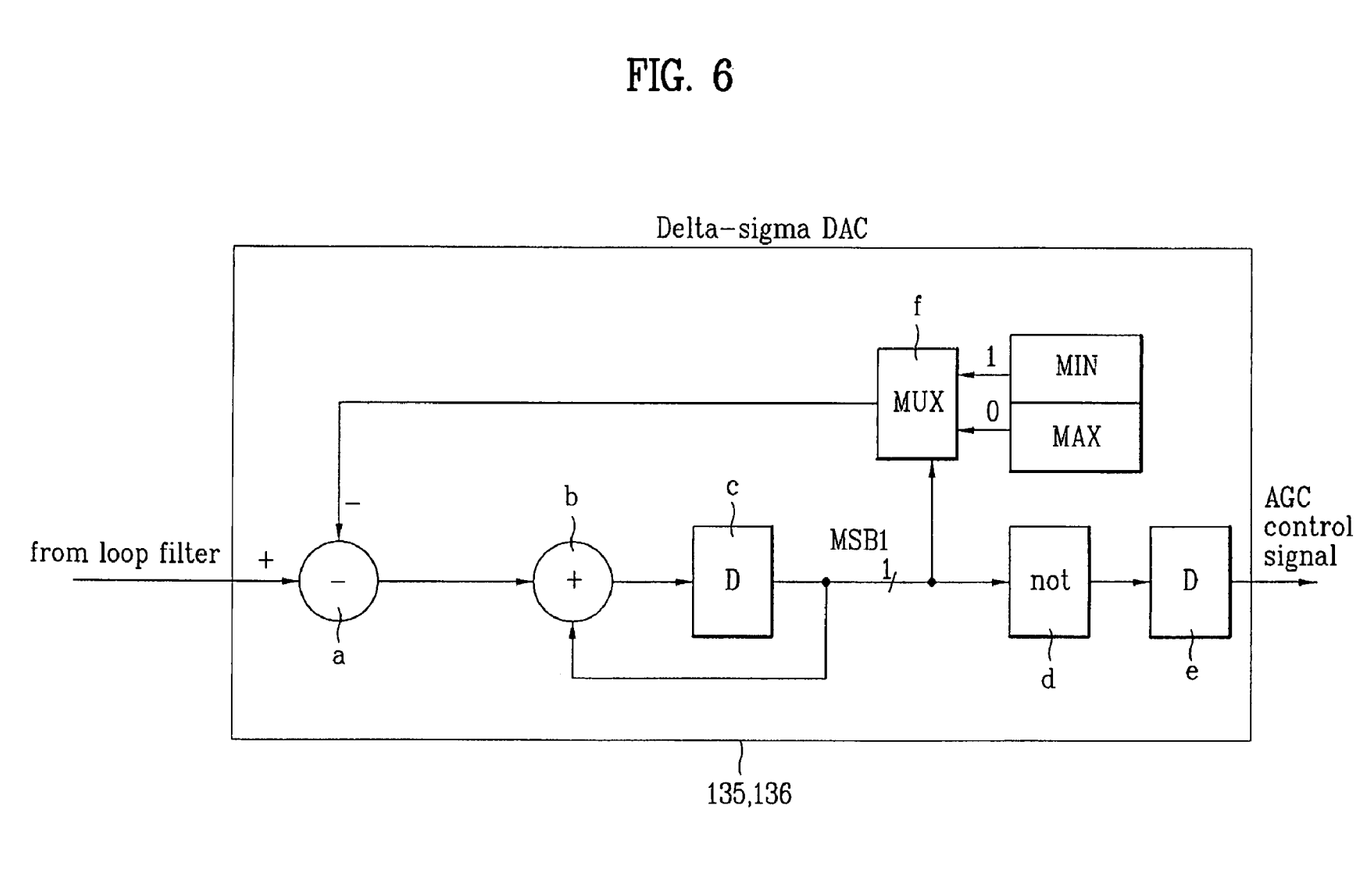

FIGS. 4 through 6 are detailed block diagrams illustrating inner constructions of an AGC according to an embodiment of the present invention.

FIG. 4 illustrates inner construction of the AGC error detector and the IF and RF loop filters included in the AGC and signal flow therebetween.

Referring to FIG. 4, a squarer 131A of the AGC error detector 131 squares a DC removed pass/baseband signal to thereby generate a power value. A subtractor 131B subtracts a predetermined AGC reference power value from the power value to thereby generate a gain error value. The gain error value is inputted to the lock detector 15 and the IF and RF loop filters 132 and 133.

An RSHIFT block 132A of the IF loop filter 132 receives the gain error value and determines a loop gain thereof.

FIG. 5 illustrates a detailed structure of the RSHIFT block 132A.

Referring to FIG. 5, the RSHIFT block 132A is constructed to include a gain generator 132AA for receiving the gain error value from the AGC gain error detector 131 and multiplying the gain error value respectively by gains according to respective steps to thereby output loop gain values, and an MUX (multiplexer) 132AB for selecting one of the loop gain values received from the gain generator 132AA and then outputting the selected on to the Loop filers.

That is, according to a step determined by the lock detector 15, the MUX 132AB selects and outputs one of the loop gain values received from the RSHIFT 132A, whereby a loop gains is determined.

According to the selected loop gain, a gain error value is accumulated by a delayer 132B and integrators 132C and 132D to thereby be gain-compensated, and the gain compensated value is outputted to the IF delta-sigma DAC 135.

Also, the delayed AGC controller 134 receives the gain compensated value and obtains a difference between the gain compensated value and the delayed AGC reference value by using the subtractor 134A therein.

The difference value is added to the AGC gain error value obtained by the AGC error detector 131, and the resulting value is inputted to the RF loop filter 133.

The RF loop filter 133 also has an RSHIFT block 133A to thereby determine a loop gain. According to the determined loop gain, input values of the RF loop filter 133 are accumulated and error-compensated, whereby a gain is distributed among the IF and RF loop filters 132 and 133.

The error-compensated value is converted into an analog signal by the RF delta-sigma DAC 136 and the analog signal is outputted as an RF AGC control signal, whereby a gain of a tuner is adjusted.

A construction and operation of the IF and RF delta-sigma DACs 135 and 136 will now be described with reference to FIG. 6.

FIG. 6 is a detailed block diagram of the IF and RF delta-sigma DACs 135 and 136. Referring to FIG. 6, the IF and RF delta-sigma DACs 135 and 136 convert the gain-compensated values from the IF and RF loop filters 132 and 133 into 1-bit analog signals and output the 1-bit analog signals respectively to the IF AGC amplifier and the tuner.

That is, a subtractor A obtains a difference between a gain error value from the loop filter 132 or 133 and a maximum value or a minimum value from an MUX F and outputs the difference value to an adder B. The adder B adds the difference value and a feedback value from a delayer C and outputs the result value to the delayer C. The delayer C delays an output of the adder C by a predetermined time, and outputs only a MSB (most significant bit) thereof to an inverter D and an MUX F and simultaneously feeds back the MSB to the adder B. The inverter D inverts an MSB of the delayer C and the delayer E delays the inverted MSB by a predetermined time, whereby an analog AGC control signal is generated.

Figure 7:
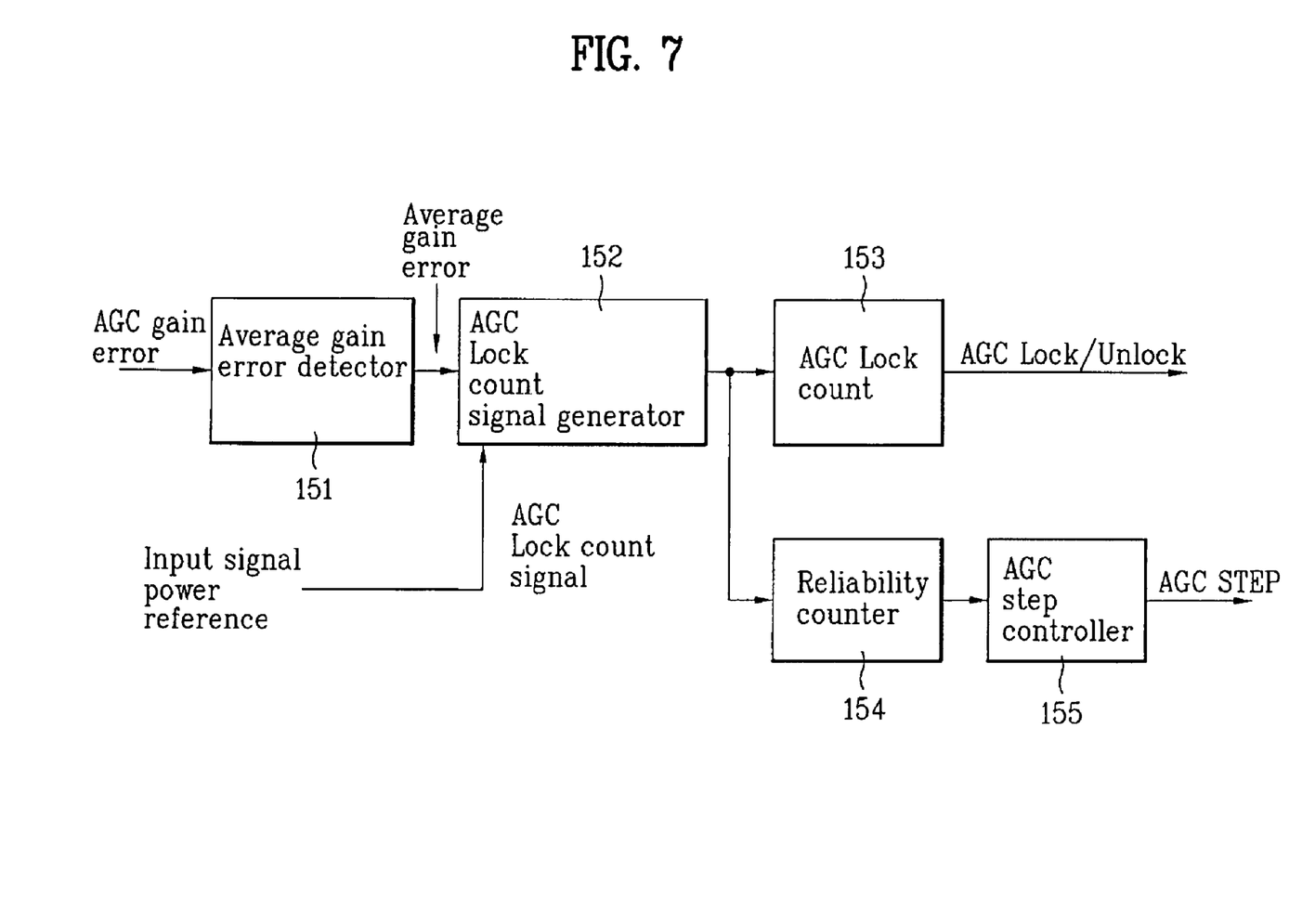
FIG. 7 is a block diagram of a lock detector of an automatic gain control device according to an embodiment of the present invention.

FIG. 7 is a block diagram of a lock detector of an AGC device according to an embodiment of the present invention.

Referring to FIG. 7, the lock detector 15 is constructed to include an average gain error detector 151 for receiving an AGC gain error value and thereby obtaining an average gain error value, an AGC lock count signal generator 152 for comparing the obtained average gain error value with an input signal reference power value and thereby generating lock/unlock count signals, an AGC lock counter 153 for receiving the AGC lock count signal and thereby generating AGC lock/unlock signals, a reliability counter 154 for receiving the AGC lock count signal and thereby securing a reliability of the AGC lock/unlock signals, and an AGC step controller 155 for generating an AGC step control signal according to the reliability-obtained AGC lock/unlock signals.

An operation of the lock detector 15 will now be described in detail with reference to FIGS. 7 through 9.

Figure 8:
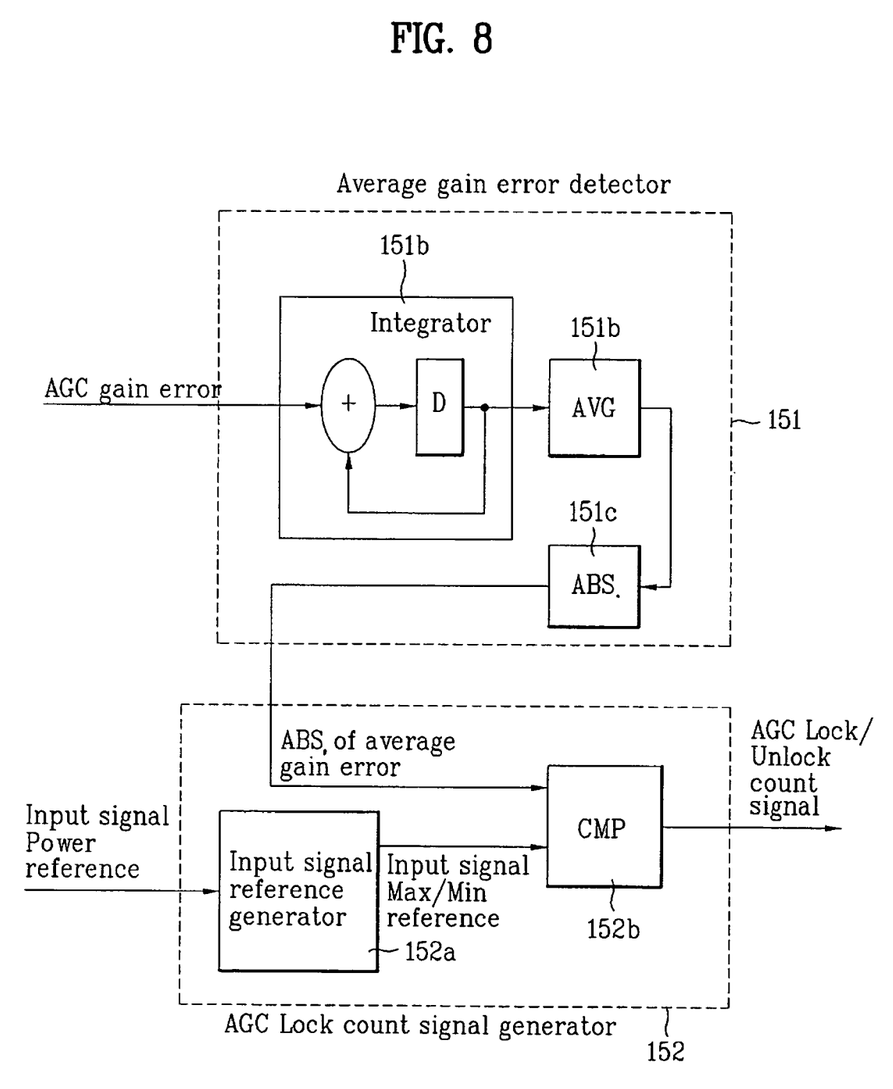
FIGS. 8 and 9 are detailed block diagrams of a lock detector of an automatic gain control device according to an embodiment of the present invention.

FIG. 8 is a detailed block diagram of the average gain error detector 151 and the AGC lock count signal generator 152.

Referring to FIG. 8, the AGC gain error value from the AGC 13 is inputted to an integrator 151A of an average gain error detector 151. The integrator 151A integrates the gain error value in a predetermined period. An average block (AVG) 151B divides the integrated value by the predetermined period to thereby obtain an average gain error. An absolute block (ABS) 151C obtains an absolute value of the average gain error.

The obtained absolute value is inputted to a comparator 152B of the AGC lock count signal generator 152.

The comparator 152B compares an input signal Max/Min reference value generated from an input signal reference generator 152A with the obtained absolute value and to thereby generate an AGC lock count signal.

That is, if the average gain error value is greater than the input signal Max/Min reference value, an unlock count signal '1' is outputted. Otherwise, if the average gain error value is below the input signal Max/Min reference value, a lock count signal '0' is outputted.

At this time, the input signal reference generator 152A receives an input signal power reference value to thereby generate an input signal Max/Min reference value that lies within an error range, ±3% of the power reference value.

Ideally, if the average gain error value is '0', the AGC can be determined to be completely converged. Actually, since an input signal can be somewhat changed according to time, if the average gain error value lies within ±3% of the power reference value, the AGC can be determined to be completely converged.

Thereafter, the lock/unlock count signal generated from the AGC lock count signal generator 152 is inputted to the AGC lock counter 153 and the reliability counter 154.

Figure 9:
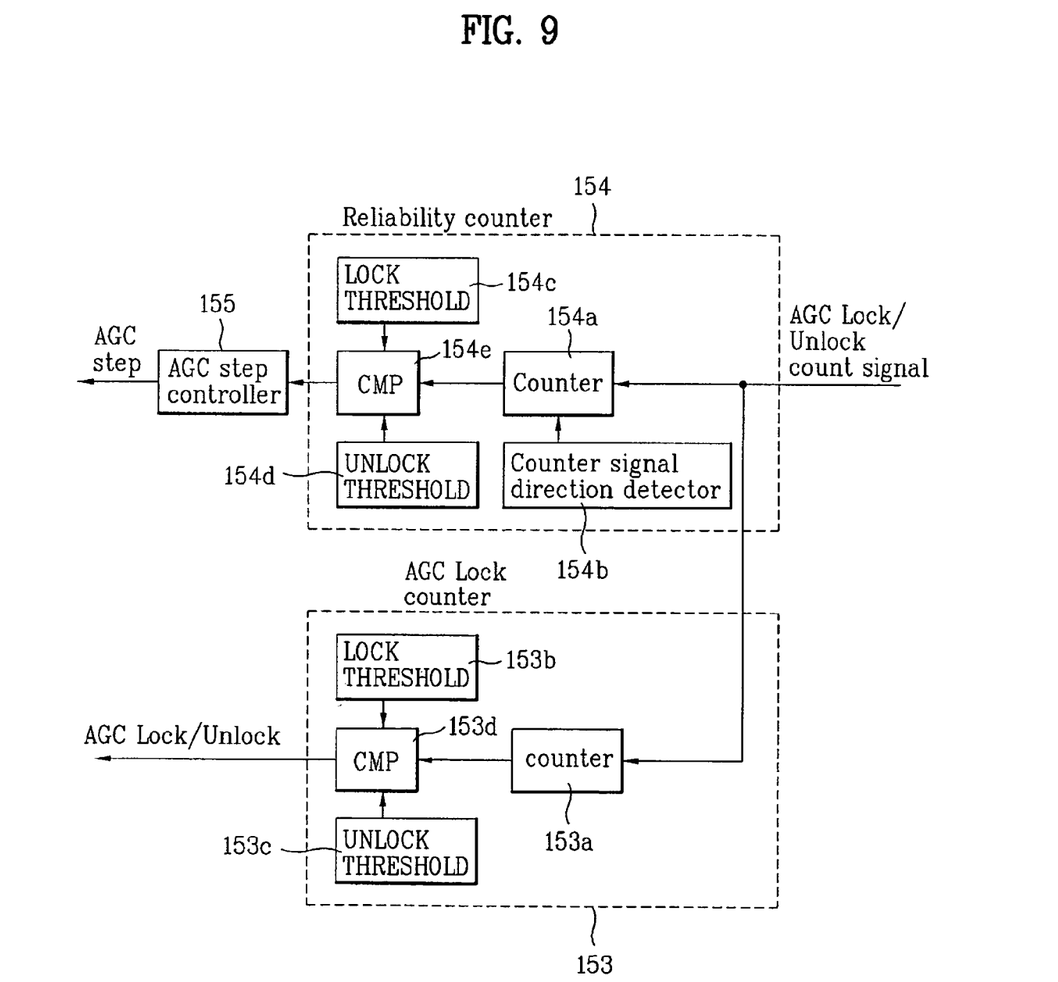

FIG. 9 is a detailed block diagram of the reliability counter 154 and the AGC lock counter 153.

Referring to FIG. 9, the reliability counter 154 is constructed to include a counter 154A, a counter signal direction detector 154B, memories 154C and 154D storing a lock threshold value and an unlock threshold value, and a comparator 154E.

The reliability counter 154 counts a signal according to a received lock/unlock count signal. That is, if the lock count signal '0' is inputted, the reliability counter 154 increase a count value. Otherwise, if the unlock count signal '1' is inputted, the reliability counter 154 decrease a count value. The comparator 154E compares the increased count value with a predetermined lock threshold value. If the increased count value is identical to or greater than the predetermined lock threshold value, the comparator 154E generates a lock signal and resets the counter 154A.

Also, the comparator 154E compares the decreased count value with a predetermined unlock threshold value. If the decreased count value is identical to or smaller than the predetermined unlock threshold value, the comparator 154E generates an unlock signal and again resets the counter 154A.

At this time, the counter signal direction detector 154G monitors a count signal. If a contrary signal occurs before the increased or decreased count signal reaches to each threshold value, the counter signal direction detector resets the counter 154A. That is, a counted signal is continuously increased or decreased. This prevents affection caused by a small change of a signal to thereby increase a stability of a system.

In this manner, the reliably-generated lock/unlock signal is inputted to the AGC step controller 155, and the AGC step controller 155 generates an AGC step control signal for increasing or decreasing an AGC step according to the lock/unlock signal. The AGC step control signal is inputted to the AGC 13, whereby a loop gain is determined.

Also, the AGC lock counter 153 is constructed to include a counter 15A, a comparator 153D, and memories 153B and 153C storing a lock threshold value and an unlock threshold value.

With the exception that the AGC lock counter 153 does not check a continuity of a count signal, the AGC lock counter 153 is operated as the same manner of the reliability counter 154 to thereby generate a lock/unlock signal.

The generated lock/unlock signal is inputted to the AM hum compensator 14 and is used for a control signal of the AM hum compensator. That is, if an AM hum noise is generated by incomplete rectification of a DC, an AGC cannot be locked. Accordingly, to make the AM hum compensator operate according to the ADC unlock signal prevents performance deterioration of a receiver by the AM hum.

The AM hum compensator 14 is constructed by a relatively short loop, whereby an AM hum generated at a DC rectifier is effectively compensated.

Also, the generated lock/unlock signal is used for determining an operation time of an after-edge carrier recovery block (CR) and an equalizer (EQ) of a QAM receiver not having a sync signal, whereby a divergence of a receive is prevented.

In the meantime, the present invention can be applied to various wired/wireless communications systems, such as VSB, QAM, QPSK (quadrature phase shift keying) and OFDM (orthogonal frequency division multiplexing) receivers.

As described above, the lock detecting device and method for an automatic gain control loop according to the present invention has the following advantages.

First, the present invention properly adjusts a loop gain of an AGC loop according channel circumstances by using AGC lock detector determining a convergence degree of an AGC device, thereby making it possible to facilitate a rapid convergence of the receiver and to minimize a jitter of an AGC loop after the convergence and to perform an optimal automatic gain control.

Secondly, the lock/unlock signal generated by the lock detector can be used for determining whether an AM hum exists and can be used as a control signal for an AM hum compensator.

Thirdly, the generated lock signal can be used for determining an operation time of a carrier recovery block and an equalizer of a QAM receiver not having a sync signal, whereby a divergence of a receive is prevented.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An automatic gain control device in a digital broadcast receiver, the device comprising:
   an AGC (automatic gain controller) configured to receive an input signal, a predetermined power reference value and an AGC step control signal, to obtain a gain error value based on the input signal and the predetermined power reference value, to determine one of a plurality of operational areas according to the AGC step control signal, to compensate the obtained gain error value according to the determined one of a plurality of operational areas and to generate an RF gain control signal and an IF gain control signal according to the compensated gain error value; and
   a lock detector configured to receive the obtained gain error value and the predetermined power reference value, to obtain an average gain error value of the obtained gain error value and to generate the AGC step control signal and an AGC lock/unlock signal based on the average gain error value and the predetermined power reference value,
   wherein the lock detector is configured to integrate the obtained gain error value in a predetermined period and to obtain the average gain error value from the integrated gain error value, and
   wherein the lock detector comprises:
      an average gain error detector configured to receive the obtained gain error value and obtain the average gain error value of the obtained gain error value;
      a lock count signal generator configured to compare the obtained average gain error value with the predetermined input signal reference power reference value in order to generate a lock/unlock count signal;
      a reliability counter configured to receive the lock/unlock count signal, to generate a lock/unlock signal, and to secure reliability of the lock/unlock signal; and
      an AGC step controller configured to generate the AGC step control signal according to the reliability-secured lock/unlock signal.

2. The device of claim 1, wherein the AGC comprises:
   a gain error detector configured to receive the input signal and the predetermined power reference value and to thereby obtain the gain error value; and
   a loop filter configured to receive the AGC step control signal, to determine the one of a pluarlity of operational areas and to accumulatively compensate the obtained gain error value.

3. The device of claim 2, wherein the AGC further comprises a DAC (digital-to-analog converter) configured to convert the compensated gain error value into an analog IF gain control signal.

4. The device of claim 2, wherein the AGC further comprises:
   a delayed AGC controller configured to obtain a difference between the compensated gain error value and a predetermined delayed AGC reference value; and
   an adder configured to add the obtained gain error value to the difference value; and
   wherein the loop filter is additionally configured to accumulatively compensate an output of the adder according to the determined operational area.

5. The device of claim 4, further comprising a DAC configured to convert the compensated output value into an analog RF gain control signal.

6. The device of claim 2, wherein the loop filer comprises:
   a RSHIFT block configured to receive the AGC step control signal and to determine the one of a plurality of operational areas; and
   a delayer and an integrator configured to accumulatively compensate the obtained gain error value.

7. The device of claim 6, wherein the RSHIFT block comprises:
   a gain determiner configured to receive the obtained gain error value from the gain error detector, to multiply the obtained gain error value by gains corresponding to the determined operational area, and output multiplication result values; and
   a MUX (MULTIPLEXER) configured to select and output one of the multiplication result values according to the determined operational area.

8. The device of claim 2, wherein the gain error detector comprises:
   a squarer configured to square the received signal to generate a power value; and
   a subtractor configured to obtain a difference between the power value and the predetermined power reference value and thereby obtain the gain error value.

9. The device of claim 1, wherein the lock detector further comprises a lock counter configured to receive the lock/unlock count signal and thereby generate the AGC lock/unlock signal for AM hum compensation.

10. The device of claim 9, wherein the lock counter comprises:
    a counter configured to increase or decrease a count signal according to the lock/unlock count signal;
    a memory configured to store a predetermined lock/unlock threshold value; and
    a comparator configured to compare the increased or decreased count signal with the lock/unlock threshold value and generate the AGC lock/unlock signal.

11. The device of claim 1, wherein the average gain error detector comprises:
    an integrator configured to receive the obtained gain error value, to accumulate the obtained gain error value in the predetermined period and to generate an integrated value; and
    an average block configured to divide the integrated value by the predetermined period and obtain the average gain error value.

12. The device of claim 1, wherein the lock count signal generator comprises:
    an input signal reference generator configured to multiply the predetemined power reference value by a predetermined ratio and thereby generate an input signal Max/Min reference value; and
    a comparator configured to compare an absolute value of the average gain error value with the input signal Max/Min reference value and thereby generate the AGC lock/unlock count signal.

13. The device of claim 12, wherein the predetermined ratio is a value that makes the input signal Max/Min reference value lie within an error range ±3% of the predetermined power reference value.

14. The device of claim 1, wherein the reliability counter comprises:
a counter configured to increase or decrease a count signal according to the lock/unlock count signal;
a count signal direction detector configured to observe an up/down direction of the increased or decreased count signal and generate a reset signal for resetting the counter when the up/down direction is changed;
a memory configured to store a predetermined lock/unlock threshold value; and
a comparator configured to compare the increased or decreased count signal with the lock/unlock threshold value and thereby generate the AGC lock/unlock signal and then to output the AGC lock/unlock signal to the AGC step controller.

15. The device of claim 1, further comprising an AM hum compensator configured to compensate a noise generated during DC rectification according to the AGC lock/unlock signal.

16. The device of claim 1, further comprising a DC remover configured to remove a DC component of the received signal.

17. The device of claim 1, wherein the AGC lock/unlock signal is further for determining an operation time of an after-edge carrier recovery block and an equalizer.

18. An automatic gain control method in a digital broadcast reception system, the method comprising:
receiving an input signal and a predetermined power reference value and obtaining a gain error value based on the input signal and the predetermined power reference value using an AGC (automatic gain controller);
obtaining an average gain error value of the obtained gain error value and generating an AGC step control signal and an AGC lock/unlock signal based on the average gain error value and the predetermined power reference value using a lock detector; and
determining one of a plurality of operational areas according to the AGC step control signal, compensating the obtained gain error value according to the determined one of a plurality of operational areas and generating an RF gain control signal and an IF gain control signal according to the compensated gain error value using the AGC,
wherein obtaining the average gain error value comprises integrating the obtained gain error value in a predetermined period and obtaining the average gain error value from the integrated gain error value, and
wherein determining the one of a plurality of operational areas comprises:
receiving the gain error value and multiplying the gain error value by gains corresponding to the operational areas to produce multiplication result values; and
selecting and outputting one of the multiplication result values.

19. The method of claim 18, wherein receiving the input signal comprises:
squaring the input signal and thereby generating a power value.

20. The method of claim 18, further comprising:
receiving the obtained gain error value in order to obtain the average gain error;
comparing the average gain error value with the predetermined power reference power value in order to generate a lock/unlock count signal;
receiving the lock/unlock count signal and reliably generating a lock/unlock signal; and
generating the AGC step control signal according to the lock/unlock signal.

21. The method of claim 20, wherein comparing the average gain error value comprises:
multiplying the predetermined power reference value by a predetermined ratio and thereby generating an input signal Max/Min reference value; and
comparing the average gain error value with the input signal Max/Min reference value and thereby generating the lock/unlock count signal.

22. The method of claim 21, wherein the unlock count signal is generated if the average gain error value is greater than the input signal Max/Min reference value.

23. The method of claim 21, wherein the lock count signal is generated if the average gain error value is smaller than the input signal Max/Min reference value.

24. The method of claim 21, wherein the predetermined ratio is a value that makes the input signal Max/Min reference value lie within an error range ±3% of the power reference reference value.

25. The method of claim 20, wherein the lock signal is generated if a count value increased according to the lock count signal is greater than a predetermined lock threshold value.

26. The method of claim 20, wherein the unlock signal is generated if a count value decreased according to the unlock count signal is smaller than a predetermined unlock threshold value.

27. The method of claim 20, wherein receiving the lock/unlock count signal comprises monitoring a count signal so that the count signal counted according to the lock/unlock count signal is continuously increased or decreased.

28. The method of claim 20, wherein the AGC lock signal is generated if a count value increased according to the lock count signal is greater than a predetermined lock threshold value.

29. The method of claim 20, wherein the AGC unlock signal is generated if a count value decreased according to the unlock count signal is smaller than a predetermined unlock threshold value.

30. The method of claim 18, wherein the AGC lock/unlock signal is used for determining an operation time of an after-edge carrier recovery block and an equalizer.

31. The method of claim 18, wherein the AGC lock/unlock signal is used as a control signal for compensating an AM hum noise generated during DC rectification.

32. The method of claim 18, wherein determing the one of a pluralilty of operational areas further comprises:
converting the compensated gain error value into an analog signal.

33. The method of claim 32, wherein determining the one of a pluralilty of operational areas further comprises:
obtaining a difference between the compensated gain error value and a predetermined delayed AGC reference value;
adding the obtained gain error value and the difference value and compensating the addition value by accumulating the addition result value; and
converting the compensated addition result value into an analog signal.

* * * * *